United States Patent [19]
Gooch et al.

[11] Patent Number: 5,305,863
[45] Date of Patent: Apr. 26, 1994

[54] CLUTCH ASSEMBLY FOR AN AUTOMATIC MECHANICAL TRANSMISSION

[75] Inventors: Douglas C. Gooch, Richland; Lloyd A. Waling; John S. Steurer, both of Kalamazoo; Paul R. Peterson, Scotts, all of Mich.

[73] Assignee: Eaton Corporation, Cleveland, Ohio

[21] Appl. No.: 998,901

[22] Filed: Dec. 30, 1992

[51] Int. Cl.⁵ .................. F16D 13/74; F16D 25/063
[52] U.S. Cl. ................. 192/70.12; 192/85 AA; 192/113 LC
[58] Field of Search ............ 192/70.12, 70.28, 85 AA, 192/106 F, 101, 113 BR, 113 BT, 113 BG, 3.26; 92/130 B, 130 D

[56] References Cited

U.S. PATENT DOCUMENTS

| | | | |
|---|---|---|---|
| 1,245,718 | 11/1917 | Herr | 192/70.28 |
| 2,740,512 | 4/1956 | Fischer | 192/106 F X |
| 2,907,428 | 10/1959 | Erwin et al. | 192/70.12 X |
| 3,306,408 | 2/1967 | Kahle | 192/85 AA |
| 4,724,942 | 2/1988 | Casse et al. | 192/70.12 |
| 4,784,019 | 11/1988 | Morscheck | |
| 4,860,861 | 8/1989 | Gooch et al. | |
| 4,905,812 | 3/1990 | Shepperd | 192/70.12 X |
| 5,109,721 | 5/1992 | Boardman et al. | |
| 5,136,897 | 8/1992 | Boardman | |

Primary Examiner—Rodney H. Bonck
Attorney, Agent, or Firm—Brooks & Kushman

[57] ABSTRACT

A lubrication system for an automatic transmission clutch assembly having a drive and driven rotary member rotatable by a common axis with a clutch element therebetween for connecting and disconnecting the members. The drive member has an internal passageway formed therein for feeding the lubricant to the clutch member. The passageway has a section which is radially spaced from the axis of rotation and as a seat formed therein for cooperating with the rotationally speed sensitive valve oriented in the first passageway. Below first rotational speed, the lubricant pressure maintains the valve against the seat restricting the flow of lubricant to the clutch element. When the driven member is rotated above the first rotational speed. Centrifugal force biases the valve off the seat, allowing lubricant to be supplied to the clutch element. Preferably, a second lubrication passageway is provided having a seat in an internal valve which selectively supplies a lubricant to the clutch element at a second higher rotational speed. In order to further reduce disengaged clutch drag at idle, a speed sensitive piston retract spring is provided to increase piston travel at low engine speeds while maintaining minimum travel at off idle operation.

18 Claims, 4 Drawing Sheets

CLUTCH ASSEMBLY FOR AN AUTOMATIC MECHANICAL TRANSMISSION

TECHNICAL FIELD

The present invention relates to automatic mechanical transmissions and, more particularly, to lock up type torque connector assemblies having a power interrupt clutch.

BACKGROUND OF THE INVENTION

Automatic mechanical transmissions are well known and widely used, especially in heavy duty vehicles. An example of a prior art transmission of this type is shown in U.S. Pat. No. 4,860,861 to Gausch et al. which is incorporated by reference herein.

To facilitate an understanding of the present invention, it is helpful to briefly review the operation of a commercially available automatic mechanical transmission, particularly the type sold by Eaton Corporation, the assignee of the present invention. The basic Eaton automatic mechanical transmission is schematically illustrated in FIG. 1 of the present application and described in detail in U.S. Pat. No. 4,860,861 and the references cited therein. The automatic mechanical transmission is made up of two main components, a torque converter assembly and a mechanical transmission. The torque converter assembly operatively connects the engine crankshaft to the mechanical transmission. The mechanical transmission has an output shaft connected to the vehicle drivetrain.

The torque converter assembly includes a conventional torque converter, a lock-up clutch and an interrupt clutch. When the lock-up clutch is engaged, the torque converter is inoperative and power is transmitted directly through the torque converter assembly. When the interrupt clutch is disengaged, the engine is decoupled from the mechanical transmission. The present invention relates to a piston return mechanism and a lubrication system for the interrupt clutch.

The prior art transmission illustrated in the U.S. Pat. No. 4,860,861 patent utilizes a simple mechanism for reducing the flow of lubricant when the interrupt clutch is disengaged. A lubricant passageway formed in the driven clutch member provides a flow of pressurized lubricant to the clutch element. When the clutch is fully disengaged and the piston retracted, the piston spring blocks the lubricant passageway. When the piston is moved off of the fully retracted position, lubricant flows through the passageway. This mechanism is described in detail in the U.S. Pat. No. 4,860,861 patent in column 1, line 51 et seq. and the related drawings.

SUMMARY OF THE INVENTION

An object of the present invention is to minimize clutch drag at engine idle speed when the clutch is disengaged, thereby minimizing idle fuel consumption.

An object of the present invention is to provide a clutch assembly for automatic mechanical transmission which has lubricant provided to the clutch when the clutch is rotated at speeds above a first rotational speed. Thus, lubricant flow to the clutch is eliminated at speeds below the first rotational speed.

Another object of the present invention is to provide a clutch lubrication system having three different lubrication levels. A "No Lubrication" level where at speeds below a first rotational speed, an "Intermediate Lubrication" level at speeds between a first and second rotational speed, and a "High Lubrication" level at speeds above a second rotational speed.

Accordingly, a clutch assembly is provided for use in an automatic mechanical transmission, which has a drive and driven clutch member rotatable about a common axis, and a clutch element interposed between the drive and driven members for connecting and disconnecting the members to interrupt the power transmission therebetween. The clutch element is actuated by a toroidal piston which cooperates with the drive member to form a toroidal fluid cavity biasing the piston axially in the direction of the clutch. A spring is provided for axially biasing the piston in the opposite direction to disengage the clutch element. A first internal lubrication passageway is formed in the drive member for feeding lubricant to the clutch element. The lubrication passageway is radially spaced from the axis of rotation and provided with an internal valve seat. A rotational speed sensitive first valve is oriented within the internal passageway for intermittently cooperating with the seat. The valve is biased against the seat at low speeds by lubricant pressure. When the drive member is rotated above a first rotational speed, centrifugal force biases the first valve off the valve seat providing lubricant to the clutch element.

Preferably, a second lubrication passageway is provided having an internal passageway spaced from the axis of rotation with a seat formed therein. A second rotational speed sensitive valve oriented in the second internal passageway is biased against the seat by lubricant pressure. The second valve is centrifugally biased off the seat opening the second passageway at speeds above a second rotational speed. The second speed is significantly higher than the first rotational speed, defining three lubrication states: a "no" lubricant state at speeds below the first speed; an "intermediate" lubrication state at speeds between the first and second speed; and a "high" lubrication state at speeds above the second rotational speed.

In order to further reduce clutch drag at idle when the interrupt clutch is disengaged, a supplemental speed sensitive piston retract spring is provided to increase piston travel. The spring rate is selected such that when no activation pressure is provided to the piston, the supplemental spring further retracts the piston, decreasing clutch drag. At higher rotational speeds, when the clutch actuation pressure is reduced to 0, there is sufficient centrifugal pressure to maintain the supplemental piston retract spring in the compressed state, thereby maintaining clutch responsiveness.

BEST MODES FOR CARRYING OUT THE INVENTION

Figure 1:
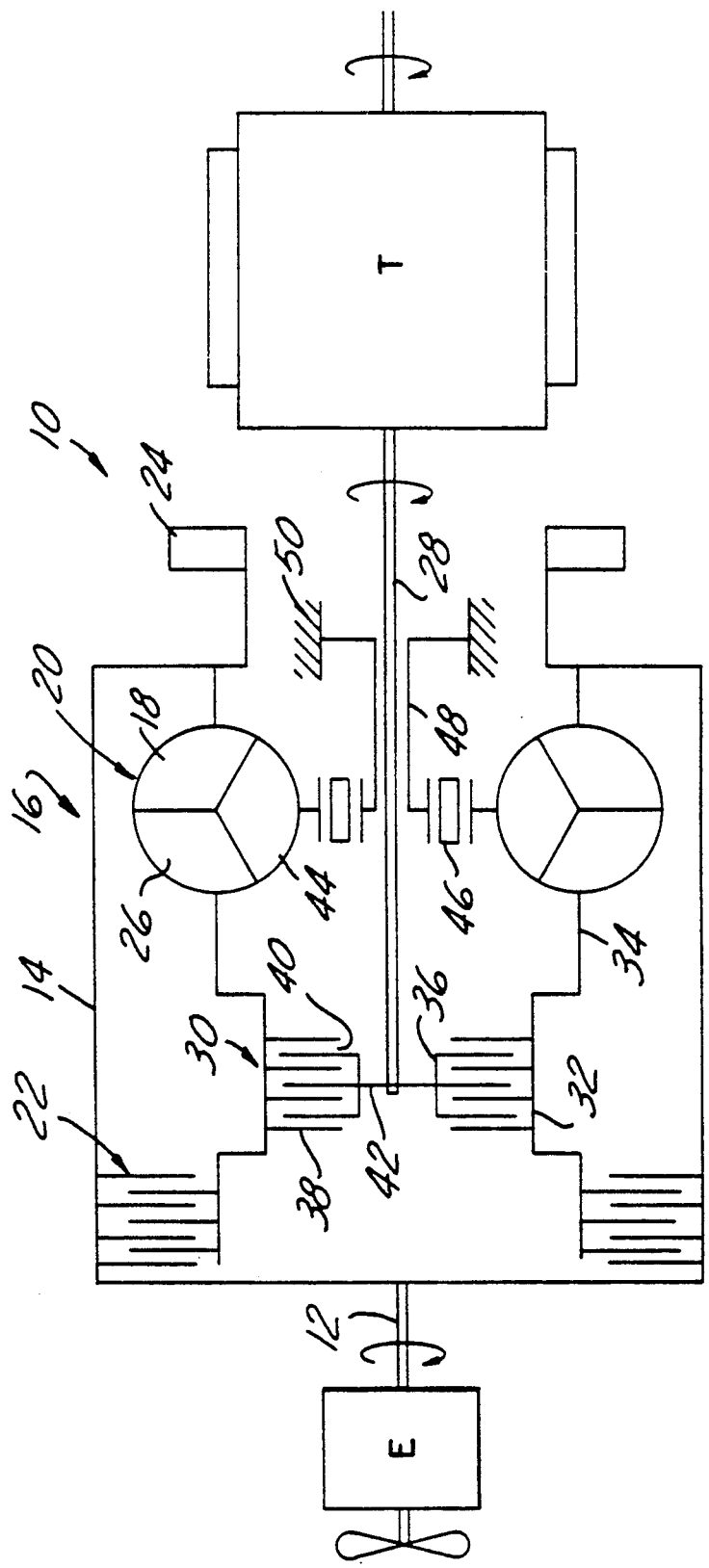
FIG. 1 is a schematic illustration of an engine torque converter assembly in a mechanical transmission system in which the present invention is used.

Referring to FIG. 1, the automatic mechanical transmission 10 in which the current invention is utilized will be described briefly in order to better understand the environment in which the present invention functions. Engine E is a source of power for a motor vehicle or the like. Engine E has a crankshaft 12 which is connected to input shroud 14 of torque converter assembly 16. Input shroud 14 is operatively connected to impeller 18 of torque converter 20. Input shroud 14 additionally cooperates with lock-up clutch 22 and hydraulic pump 24, as schematically illustrated.

When torque converter 20 is in the operative mode, lock-up clutch 22 is disengaged, and torque is transmitted from impeller 18 to turbine 26 in a conventional manner. Turbine 26 is disengagably connected to transmission input shaft 28 of transmission T via interrupt clutch 30. Interrupt clutch 30 includes a drive member 32 operatively connected to turbine 26 by web member 34. Drive member 32 cooperates with driven member 36, both of which rotate about a common axis. A clutch element is interposed between the drive and driven members for interrupting the transmission of power therebetween. The clutch element is comprised of two series of clutch plates, drive plates 38 which are connected to drive member 32 and driven plates 40 which are connected to driven member 36. A rotary hub 42 couples driven member 36 to transmission input shaft 28.

When power is being transmitted through torque member 20, slippage between the turbine and the impeller varies as a function of rotational speed and torque. Torque multiplication is achieved as a result of the reaction torque transmitted to stator 44 via one-way clutch 46 and tubular shaft 48, which is grounded to housing 50. At high speed normal load conditions, it is desirable to transmit power directly through torque converter assembly 16 to transmission T so as to avoid friction losses occurring in torque converter 20. To bypass the torque converter, lock-up clutch 22 is engaged, directly connecting input shroud 14 to driven member 36, eliminating relative rotation between impeller 18 and turbine 26. There are three distinctly different operating modes: the torque converter active mode, in which its power is transmitted from the engine through the torque converter 20 to the transmission T; the lock-up mode, in which the power is transmitted directly through the torque converter assembly 16 while the torque converter is locked; and the interrupt mode, in which the interrupt clutch is disengaged, disconnecting the engine crankshaft from transmission input shaft 28. The present invention focuses primarily upon minimizing the friction associated with interrupt clutch drag which occurs when the interrupt clutch is disengaged.

Figure 2:
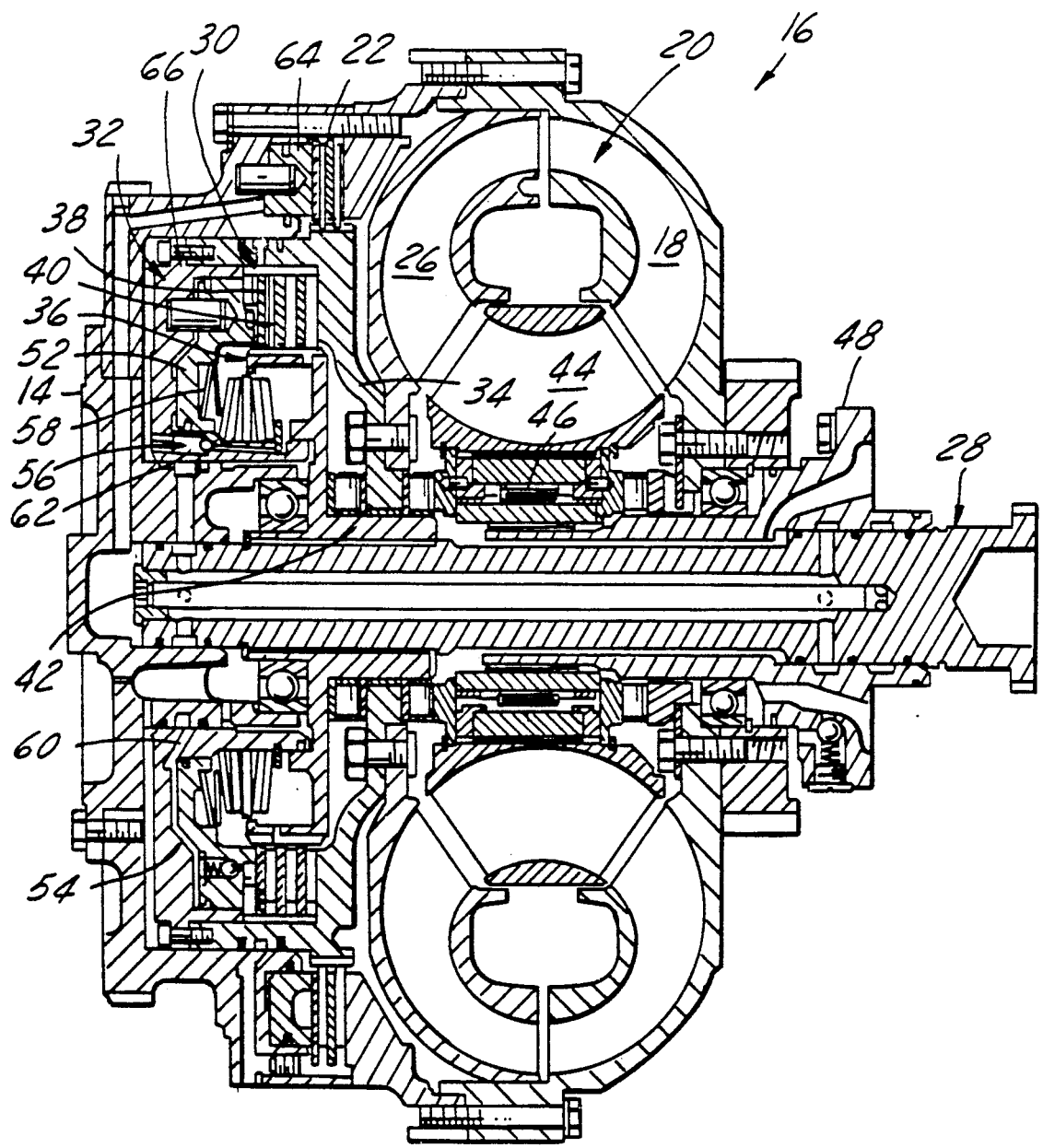
FIG. 2 is a cross-sectional side elevation of a torque converter assembly utilizing the present invention.

With reference to FIG. 2, a detail cross-sectional side elevation of torque converter assembly 16 is shown. In the active torque converter mode, power is transmitted from input shroud 14 to impeller 18 of torque converter 20. Impeller 18 drives turbine 26, which is connected to drive member 32 by web member 34. During normal torque operation interrupt clutch 30 is engaged, operatively locking drive and driven members 32 and 36. Interrupt clutch 30 is engaged when piston 52 is biased against the clutch drive and driven plates 38 and 40, preventing the relative rotation therebetween. Piston 52 is generally annular in shape, sealingly slidably cooperating with drive member 32 to define a toroidal variable displacement chamber 54 therebetween. Interrupt piston 52 is biased to the disengaged pistons by a pair of belleville washer stacks, primary piston spring 56 and supplemental piston spring 58. Primary piston spring 56 is relatively stronger, having sufficient load to urge the piston to a disengaged position at all normal engine operating speeds. Supplemental piston spring 58 is relatively weaker and is interposed between piston 52 and primary spring 56 to further cause the piston to retract relative to clutch plates 38 and 40.

Drive member 32 has formed therein an input/output port 60 connected to the variable displacement chamber 54 at one end and having the other end connected to a hydraulic signal source which is radially spaced inboard of the variable displacement cavity. Due to the location of the hydraulic signal source radially inboard of the variable displacement cavity, the pressure within the variable displacement cavity will be equal to the hydraulic signal pressure plus a centrifugal pressure component which is a function of rotational speed of the drive member. As previously indicated, the primary spring 56 is sufficiently strong to cause the piston to retract at all normal operating speeds over-coming any typically encountered centrifugal pressure. The supplemental spring 58 is much weaker, however, the supplemental spring is strong enough to cause the piston to retract further at idle speeds to reduce interrupt clutch drag, thereby increasing the relative separation between the drive and driven plates at higher speeds. At speeds above 800 rpm, for example, the centrifugal pressure within the variable displacement cavity will be sufficiently high to prevent the supplemental spring from further retracting the piston. The amount of supplemental piston movement will vary between maximum retract at or slightly above idle speed (approximately 400 rpm) to no additional piston movement at a selected higher speed with varying amount of supplemental movement at intermediate speeds therebetween.

Figure 3:
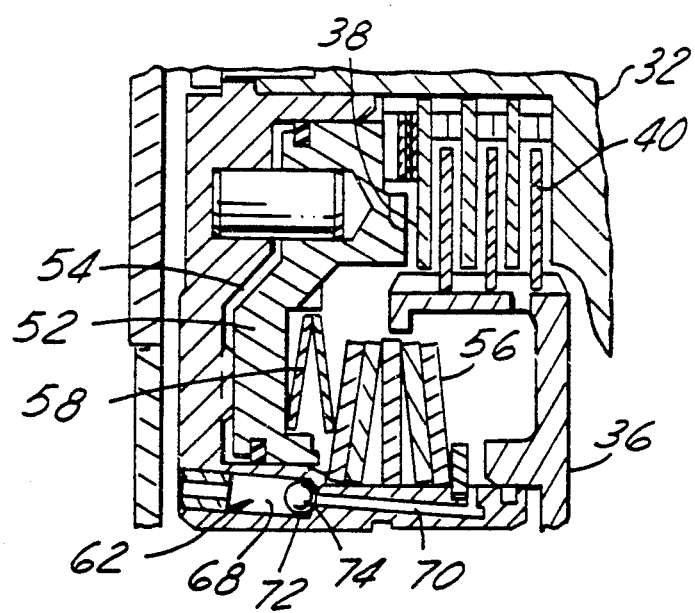
FIGS. 3-5 are a series of schematic illustrations showing the idle disengaged and engaged states of the piston and piston springs.
Figure 4:
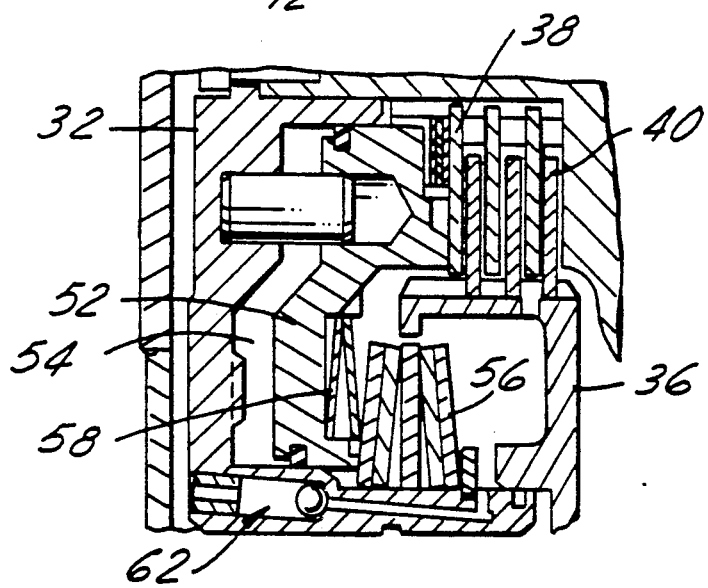
Figure 5:
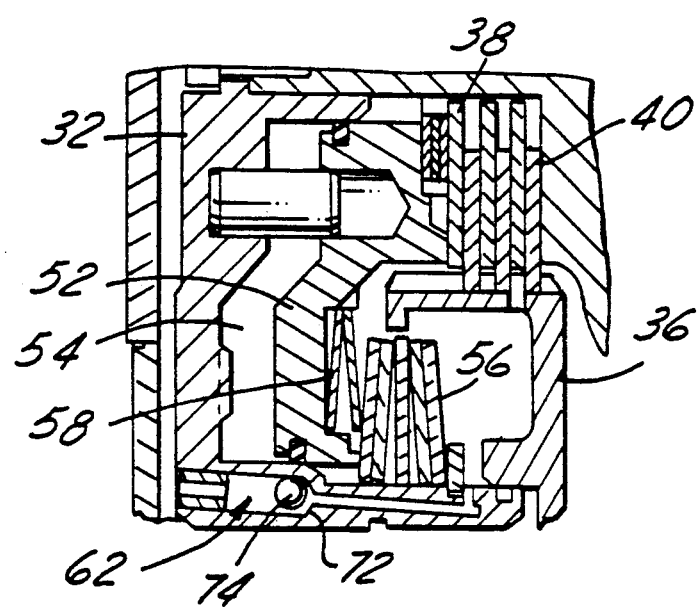

A high and low supplemental spring operating range of 400 to 800 rpm is preferred, but other ranges can be achieved according to the particular needs of the engine and transmission. The spring rate of the supplemental spring needs to be determined on an application to application basis dependent upon the radial location of the variable displacement chamber, the location of the hydraulic single input of the piston area and the amount of supplemental piston travel desired. The three states of the interrupt clutch piston are shown in FIGS. 3-5. In FIG. 3, the piston is shown fully retracted by both the primary spring 56 and supplemental spring 58. There is a relatively large spacing between drive and driven clutch plates 38 and 40 and minimal volume in the variable displacement chamber 54.

In FIG. 4, the drive member is rotating at a speed above 800 rpm. The centrifugal pressure component of the fluid within the variable displacement cavity is sufficient to exceed the force of supplemental spring 58, thereby preventing any supplemental piston retraction beyond that achieved by the primary spring 56. The clutch plates are separated, however, the relative spacing therebetween is less than that shown in FIG. 3.

In FIG. 5, the interrupt clutch is engaged by piston 52, compressing the drive and driven plates 38 and 40, thereby preventing relative rotation therebetween. The variable displacement cavity is at its maximum volume and both the primary and supplemental piston springs 56 and 58 are compressed.

Figure 6:
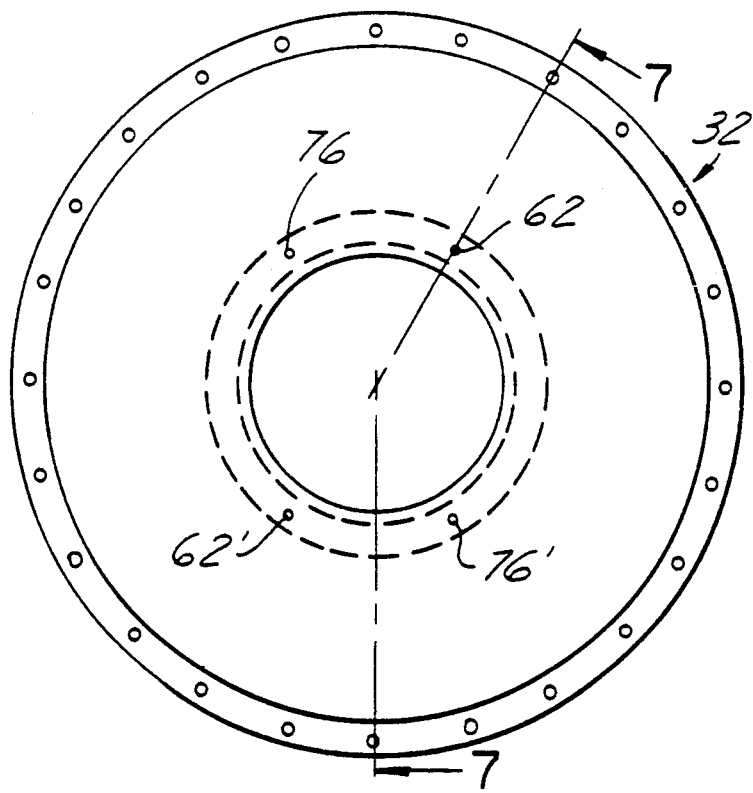
FIG. 6 is a front axial end view of a clutch cover pack.

In order to further limit interrupt clutch drag when the clutch is disengaged, the flow of lubricant to the clutch is eliminated at low speed. Lubricant flow is controlled by an internal lubricant passageway 62 which is formed in drive member 32. The drive member 32 is made up of a splined drum 64 and a cover plate 66. Internal lubrication passageway 62 is formed in cover 66 as shown in greater detail in FIGS. 6-8. Lubricant flows into the lubrication passageway from a lubrication chamber oriented between input shroud 14 and drive member 32. Lubrication passageway 62 has a large diameter section 68 and a small diameter section 70 with a frustoconical valve seat 72 formed therebetween. Ball 74 provides a rotational speed sensitive valve for sealingly cooperating with valve seat 72. Fluid pressure force $F_p$ provided by lubricant within the lubrication passageway 62 biases ball 74 sealingly against seat 72. As the drive member rotates, centrifugal force $F_c$ biases ball 74 radially outward. Depending upon the angle of the valve seat $\beta$, the inclination of the lubrication passageway axis $\alpha$, the speed at which force $F_c$ overcomes force $F_p$ and reaction force $F_r$ can be varied.

In the present example, an angle $\beta$ of approximately 66° and an angle $\alpha$ of approximately 4°, resulted in ball 74 moving off of the seat 72 thereby opening the lubrication passageway at a rotational speed of approximately 800 rpm. The calculation of the speed above which the ball will move off the seat is surprisingly complex. Simply stated, the ball will move off the seat when force $F_b \cos(\beta)$ is equal to force $F_c \cos(\beta+\alpha)$. While this equation is very simple, it is more complex in reality since pressure is a function of rotational velocity. The equilibrium signal pressure ($P_s$) required to maintain the ball on the seat can be approximated for various rotational speeds (w) as follows:

$$P_S = \omega^2 \left[ \frac{\sin(\beta + \alpha)}{\cos^3 \beta} \left( \frac{2 D_B R_R (W_B - W_0)}{3G} \right) - \frac{W_0 (R_R^2 - R_E^2)}{2G} \right]$$

Where:
$\beta$ = Seat Half-Angle
$\alpha$ = Angle lubrication passageway
$P_s$ = Signal Pressure, PSI
$W_0$ = Oil Density, lb/in³
$W_B$ = Ball Density, lb/in³
$\omega$ = Rotational Velocity, rad/sec
$D_B$ = Ball Diameter, in
$R_R$ = Radius of Rotation, in
$R_E$ = Signal Pressure Radius
G = Gravitational Concept in/sec²

Figure 7:
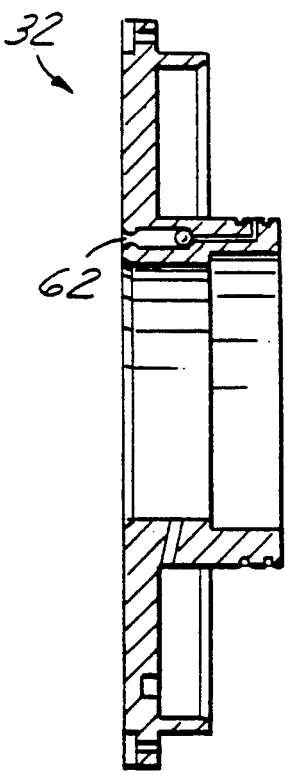
FIG. 7 is a cross sectional side view taken along section 7—7 of FIG. 6.
Figure 8:
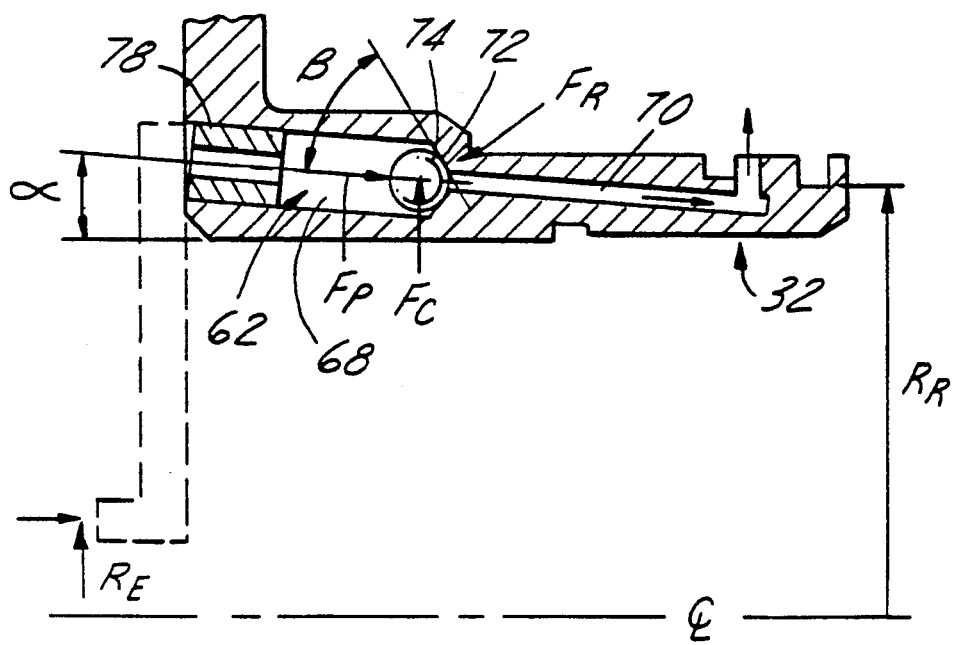
FIG. 8 is a schematic illustration of a lubrication passageway and a rotational speed sensitive valve.

The above approximation works satisfactorily where angle $\alpha$ is relatively small, e.g. between 0° and 10°. Note the positive a angle causes the lubrication line to be inclined relative to the axis of rotation and in a direction which causes lubricant to flow radially inwardly, as illustrated in FIGS. 7 and 8.

In operation, at idle speed, ball 74 sealingly cooperates with seat 72 restricting the flow of lubricant to the interrupt clutch, thereby reducing the oil between the drive and driven clutch plates, significantly reducing friction. Rather than simply turning lubrication abruptly on and off, the preferred embodiment of the invention illustrated utilizes a series of lubrication passageways radially spaced about the axis of rotation which have at least two different valve opening speeds. In the preferred embodiment four passageways provide passageways 62 and 62' which open at approximately 800 rpm and lubrication passageways 76 and 76' which open at approximately 1400 rpm. The only difference between lubrication passageways 62 and 76 is the angle of the seat $\beta$ which is formed in the lubrication passageway. In lubrication passageways 76 and 76' $\beta$ is approximately 62°. Balls 74 are the same diameter and all four lubrication passageways and in each case a feral 78 is pressed into the lubrication passageway to prohibit the ball from escaping. It should be noted, however, that it would be possible to bias the ball against seat utilizing a spring, however a spring is unnecessary. The present design utilizes a simple machined seat angle to control operation, which works well repeatedly and cost effectively.

The lubrication system illustrated in the preferred embodiment has three distinct lubrication states: a no lubricant flow state at speeds below a first rotational speed; an intermediate flow state where one pair of lubrication passageways are open at speeds above the first rotational speed but below a second rotational speed and a maximum lubricant flow state at speeds above the second rotational speed. Preferably, the first rotational speed is between 600 and 1000 rpm and a second rotational speed is between 1000 and 1500 rpm. The conical valve seats in the lubrication passageways that open at the first rotational speed preferably have a half angle $\beta$ of approximately 60° to 70°. The valve seats of the second series of lubrication passageways which open at the higher second rotational speed having a conical half angle $\beta$ which is approximately 3° to 5° less than that of the first valve seats. To achieve a drive element with minimal radial thickness, the lubrication passageways are inclined slightly at an angle relative to the axis of rotation, to cause the lubricant to flow radially inward and angle $\alpha$ which is less than 10°. Preferably, a falls between 3° and 5°.

While the best mode for carrying out the invention has been described in detail, those familiar with the art to which this invention relates will recognize various alternative designs and embodiments for practicing the invention as defined by the following claims.

What is claimed:

1. A clutch assembly for use in an automatic mechanical transmission comprising:
   a drive and driven member which are rotatable about a common axis;
   a clutch element interposed between the drive and driven members for connecting and disconnecting said members to interrupt the transmission of power therebetween in response to a hydraulic signal;
   a first internal lubrication passageway formed in the drive member for feeding lubricant to the clutch element, said lubrication passageway having a section which is radially spaced from said axis and is provided with a valve seat; and
   a rotational speed sensitive first valve oriented within the first internal lubrication passageway and intermittently cooperating with the valve seat, said first valve being biased against the valve seat by the lubricant pressure, blocking the flow of lubricant to the clutch element when the drive member rotates at speeds below a first rotational speed, said first valve being centrifugally biased off the valve seat when the drive member is rotated at speeds above said first rotational speed thereby opening the lubricant passageway and supplying lubricant to the clutch element.

2. The clutch assembly of claim 1 wherein said first valve comprises a ball and said valve seat has an annular surface sized to sealingly cooperate with said ball.

3. A clutch assembly for use in an automatic mechanical transmission comprising:
 a drive and driven member which are rotatable about a common axis;
 a clutch element interposed between the drive and driven members for connecting and disconnecting said members to interrupt the transmission of power therebetween;
 a first internal lubrication passageway formed in the drive member for feeding lubricant to the clutch element, said lubrication passageway having a section which is radially spaced from said axis and is provided with a valve seat;
 a rotational speed sensitive first valve oriented within the first internal lubrication passageway and intermittently cooperating with the valve seat, said first valve being biased against the valve seat by the lubricant pressure, blocking the flow of lubricant to the clutch element when the drive member rotates at speeds below a first rotational speed, said first valve being centrifugally biased off the valve seat when the drive member is rotated at speeds above said first rotational speed thereby opening the lubricant passageway and supplying lubricant to the clutch element;
 a second internal lubrication passageway formed in the drive member for feeding lubricant to the clutch element, said second lubricant passageway being spaced from the axis of rotation and provided with an internal valve seat; and
 a rotational speed sensitive second valve oriented in the second internal lubrication passageway and intermittently cooperating with the valve seat, said second valve being biased by lubricant pressure against the seat at speeds below a second rotational speed restricting the flow lubricant to the clutch and being centrifugally biased off the seat above the second rotational speed to supply lubricant to the clutch;
 wherein no lubricant is provided to the clutch element through the first and second internal lubrication passageways at rotational speeds below said first rotational speed, wherein at speeds above the first rotational speed but below the second rotational speed, lubricant is provided to the clutch element through the first internal passageway only, and wherein at speeds above the second rotational speed, lubricant is provided to the clutch element through both the first and second internal passageways to the clutch element.

4. The clutch assembly of claim 3 wherein the first and second internal lubrication passageways valve seats are each frustoconical in shape and said first and second valves comprise a pair of balls cooperating with the first and second valve seats, wherein the valve seat angles are selected in order to cause the first and second valves to open at the first and second rotational speeds.

5. The clutch assembly of claim 4 wherein said first and second internal lubricant passageway sections are inwardly inclined no more than 10° relative to the axis of rotation in a direction to cause fluid to flow radially inward.

6. A clutch assembly for use in an automatic mechanical transmission comprising:
 a drive and a driven member which are rotatable about a common axis;
 a clutch element for alternatively connecting and disconnecting the drive and driven members to intermittently transmit power therebetween;
 the first and second internal lubrication passageways formed in the drive member for feeding lubricant to the clutch element, said lubrication passageways each having a section which is radially spaced from said axis of rotation and provided with a valve seat; and
 the first and second ball valves oriented within the first and second internal passageways respectively for cooperation with the first and second valve seats, said first and second ball valves being biased against their respective seats by a lubricant pressure at low speeds restricting the flow of the lubricant to the clutch element, wherein said first valve is centrifugally biased off the seat when driven members rotate above a first rotational speed, providing a limited supply of lubrication to the clutch element and wherein said second ball valve is centrifugally biased off of the valve seat when the driven member is rotated above a second and higher rotational speed, thereby increasing the volume of lubricant supplied to the clutch element.

7. The clutch assembly of claim 6 wherein said first and second valve seats are generally frusto-conical in shape having a seat angle selected to achieve a first rotational speed between 600 and 1000 rpm and said second valve seat is generally frusto-conical in shape having a seat angle to achieve a second higher rotational speed falling within the range of 1000 to 1500 rpm.

8. The clutch assembly of claim 7 wherein said first and second internal lubrication passageways are inwardly inclined less than 10° relative to said axis of rotation.

9. The clutch assembly of claim 8 wherein said first and second internal lubrication passageways are inwardly inclined between 3° and 5°.

10. The clutch assembly of claim 9 wherein said first valve seat has a total conical half angle of 60°-70° and said second valve seat has a conical half angle which is 3°-5° less than that of the first valve seat.

11. A clutch assembly for use in an automatic mechanical transmission comprising:
 a drive and driven member which are rotatable about a common axis, a series of drive and driven clutch plates respectively connected to the drive and driven members for connecting and disconnecting said members to interrupt the transmission of power therebetween;
 an annular piston shiftably cooperating with one of said members to define a variable displacement cavity therebetween for receiving pressurized hydraulic fluid, said member having formed therein an input/output port having one end in communication with the variable displacement cavity and another end in communication with a hydraulic signal source which is spaced radially inboard of the variable displacement cavity;
 a primary piston spring cooperating with the piston and one of said members to bias the piston away from the clutch plates when there is no hydraulic pressure signal; and a supplemental piston spring cooperating with the piston and one of said members to bias the piston further away from the clutch plates when there is no hydraulic pressure signal and the drive member is rotating at idle speed, said supplemental piston spring being sufficiently weak that a centrifugal hydraulic pressure resulting from the rotational speed of the variable displacement cavity and the radial orientation of the hydraulic pressure source maintains the supplemental spring compressed when the hydraulic pressure signal is eliminated when the variable displacement cavity is rotating at high speed, thereby minimizing piston travel at high speed while maintaining maximum piston travel at idle speed.

12. The clutch assembly of claim 11 wherein said annular piston shiftably cooperates with the drive member to define the variable displacement cavity therebetween.

13. The clutch assembly of claim 12 wherein said primary piston spring comprises a belleville washer stack cooperating with the drive member and the annular piston.

14. The clutch assembly of claim 13 wherein said supplementary piston spring comprises a belleville washer stack interposed between the annular piston and the primary piston spring.

15. The clutch assembly of claim 11 further comprising:

a first internal lubrication passageway formed in the drive member for feeding lubricant to the clutch element, said lubricant passageway having a section which is radially spaced from said axis and is provided with a valve seat; and a rotational speed sensitive first valve oriented within the first internal lubrication passageway and intermittently cooperating with the valve seat, said first valve being biased against the valve seat by the lubricant pressure, blocking the flow of lubricant when the drive member rotates at speeds below a first rotational speed, said first valve being centrifugally biased off the valve seat when the drive member is rotated at speeds above said first rotational speed, thereby opening the lubricant passageway and supplying lubricant to the clutch element.

16. The clutch assembly of claim 15 further comprising:

a second internal lubrication passageway formed in the drive member for feeding lubricant to the clutch element, said second lubricant passageway being spaced from the axis of rotation and provided with an internal valve seat; and a rotational speed sensitive second valve oriented in the second internal lubrication passageway and intermittently cooperating with the valve seat, said second valve being biased by lubricant pressure against the seat at speeds below a second rotational speed restricting the flow lubricant to the clutch and being centrifugally biased off the seat above the second rotational speed to supply lubricant to the clutch;

wherein no lubricant is provided to the clutch element through the first and second internal lubrication passageways at rotational speeds below said first rotational speed, wherein at speeds above the first rotational speed but below the second rotational speed, lubricant is provided to the clutch element through the first internal passageway only, and wherein at speeds above the second rotational speed, lubricant is provided to the clutch element through both the first and second internal passageways to the clutch element.

17. A method for reducing disengaged clutch drag in an automatic mechanical transmission, comprising:

providing a first internal passageway in a rotary drive member of a clutch assembly, said internal passageway providing a lubricant to a clutch element, with a section of said lubrication passageway which is radially spaced from the axis of rotation defining a conical valve seat;

providing a first ball valve sized to cooperate with the valve seat within the internal passageway;

pumping lubricant through the internal passageway in a direction to bias the ball against the valve seat where upon the flow of lubricant to the clutch element is restricted; and automatically centrifugally biasing the ball off the seat in response to rotation of the drive member above a selected rotational speed thereby providing lubricant to the clutch element.

18. The method of claim 17 further comprising:

providing an annular piston shiftably cooperating with the drive member to define a variable displacement cavity therebetween for receiving pressurized fluid from an hydraulic signal source spaced radially inboard thereto, said piston cooperating with the clutch element for connecting and disconnecting said clutch drive and driven members to interrupt the transmission of power therebetween;

biasing the piston away from the clutch element utilizing a primary piston spring which is sufficiently strong to move the piston away from the clutch element at all normal operating speeds when there is no pressure signal; and further biasing the piston away from the clutch element utilizing a weaker supplemental piston spring to automatically vary the piston travel as a function of rotational speed as a result of the centrifugal hydraulic pressure caused by the rotational speed of the drive member and the radial orientation of the hydraulic source of the variable displacement cavity maximizing piston travel at idle speed to reduce friction and minimizing piston travel at high speeds.

* * * * *

UNITED STATES PATENT AND TRADEMARK OFFICE
CERTIFICATE OF CORRECTION

PATENT NO. : 5,305,863

DATED : April 26, 1994

INVENTOR(S) : Gooch et al.

It is certified that error appears in the above-identified patent and that said Letters Patent is hereby corrected as shown below:

Column 5, line 59, delete "a", and insert --α--.

Signed and Sealed this

Sixteenth Day of August, 1994

Attest:

BRUCE LEHMAN

Attesting Officer

Commissioner of Patents and Trademarks